United States Patent [19]

Schiller et al.

[11] 4,175,100

[45] Nov. 20, 1979

[54] PREPARATION OF ANIONIC POLYMERS FOR USE AS SCALE INHIBITORS AND ANTI-PRECIPITANTS

[75] Inventors: Arthur M. Schiller, Stamford; Richard M. Goodman, Norwalk; Roger E. Neff, Stamford, all of Conn.

[73] Assignee: American Cyanamid Company, Stamford, Conn.

[21] Appl. No.: 863,565

[22] Filed: Dec. 22, 1977

Related U.S. Application Data

[62] Division of Ser. No. 735,310, Oct. 26, 1976, Pat. No. 4,072,607.

[51] Int. Cl.² .................... C08F 220/06; C08L 33/02
[52] U.S. Cl. .................................. 525/327; 526/74; 526/240; 526/303; 525/336; 525/339; 525/383
[58] Field of Search .................. 260/874; 526/14, 26, 526/240, 303, 74

[56] References Cited

U.S. PATENT DOCUMENTS

| 2,886,558 | 5/1959 | Friedlander | 526/240 |
| 3,493,500 | 2/1970 | Volk et al. | 260/874 |
| 3,573,263 | 3/1971 | Gill | 526/240 |
| 3,839,500 | 10/1974 | Dexter | 260/874 |

*Primary Examiner*—Harry Wong, Jr.
*Attorney, Agent, or Firm*—William J. van Loo

[57] ABSTRACT

An anionic polymer of acrylamide having a skewed molecular weight distribution such that about 60% of said polymer has a molecular weight of about 500 to 2,000 and about 10% of said polymer has a molecular weight of about 4,000 to 12,000 has been discovered. The process of manufacturing this skewed molecular weight distribution anionic polymer is described. Its use as a scale inhibitor for controlling the deposition of adherent scales on the walls of vessels or pipes, and as an anti-precipitant for keeping alkaline earth cations in solution is also described. The use of the anionic polymer of acrylamide consisting of a skewed molecular weight could be used in recirculating water systems, boilers, and in evaporative and reverse osmosis desalination systems.

5 Claims, 4 Drawing Figures

PREPARATION OF ANIONIC POLYMERS FOR USE AS SCALE INHIBITORS AND ANTI-PRECIPITANTS

This is a division of application Ser. No. 735,310, filed Oct. 26, 1976, now U.S. Pat. No. 4,072,607, issued Feb. 2, 1978.

BACKGROUND OF THE INVENTION

The following invention relates to an anionic polymer having a skewed molecular weight distribution useful as a scale inhibitor and anti-precipitant. The anionic polymer may be made by a process which varies the amount of chain transfer agent during continuous polymerization, or the anionic polymer may be made by a physical blending.

The interest in scale inhibitors has been a continuous one. Many liquid flow applications require scale free operation, or, as a minimum, reduced scale buildup, to perform in a maintenance free and consequently economical manner. This is because these applications usually require heat transfer systems. For example, it is of particular importance to inhibit or minimize scale on the surfaces of boilers, heat exchangers, turbines, steam generators, pumps and steam and other fluid condensers. As a general statement, it can be said that any machine or other piece of equipment using water as at least one component and/or having a metal thermal transfer surface performs more efficiently when scale is kept to a minimum.

When certain alkaline earth metals are present in the liquid, there seems to be a great propensity for scale buildup. The alkaline earth metals preponderantly present and, therefore, of particular concern are calcium and magnesium.

There is, therefore, an almost continuous search in the art for compositions which will reduce or arrest the scale buildup of alkaline earth metal salts onto heat transfer and other surfaces.

As a general statement, there is an on-going need for scale inhibitors in industrial operations. Industrial processing with such equipment as air conditioning, refrigeration, heat exchange and evaporation, requires that the alkaline earth metal compounds be inhibited from depositing out of the water.

When certain industrial operations are being performed, for example, cooling operations, the alkaline earth metal compounds may be present in mineral matter such as slime or roiled sediment. These compounds would tend to cement themselves together as a strongly adherent scale which would interfere with the water flow.

In the prior art, anionic polymers have been used as scale inhibitors. See, for example, U.S. Pat. Nos. 3,663,448 and 3,463,730. These patents are incorporated herein by reference. Generally, scale inhibitors in the prior art have been used in the molecular weight range of about 500 to about 12,000.

There appears to be confusion in the art as to the definition of scale inhibitors and anti-precipitants. The following terms seem to have been used interchangeably either singly or in combination: scale inhibitor which would also include the term anti-scalant, anti-precipitant, anti-nucleation agent, and dispersing agent.

In this invention, the term scale inhibitor means a composition which inhibits the deposition of adherent scale deposits on the surfaces or parts of metal heat exchange surfaces. The term anti-precipitant means a composition which hinders the precipitation of a solid or the formation of turbidity in bulk solutions.

In certain applications there is a need for an anti-precipitant but not necessarily for a scale inhibitor. An example of this is in oil field brines where precipitated particles would tend to clog the porous rock. A scale inhibitor would not be necessary in this application because there are no heat transfer surfaces.

In other applications, the use of a scale inhibitor and anti-precipitant would complement each other. An example of this application is in recirculating cooling water systems where the heat transfer surfaces must be clean, and where the restricted flow areas must be clear of precipitated particles.

In yet another application, there is a need for a scale inhibitor without the need for an anti-precipitant. An example of this is in a boiler, where a scale inhibitor is necessary to reduce or eliminate the scale buildup in a boiler tube.

The confusion in the art has caused anti-precipitants to be used as scale inhibitors at a great loss of economic efficiency. However, as indicated above, anti-precipitants have been made for other applications. In fact, as indicated below, they require a different MW range.

SUMMARY OF THE INVENTION

The discovery has now been made that a composition of matter consisting of an anionic polymer of acrylamide having a skewed molecular weight distribution is useful as a scale inhibitor for controlling the deposition of adherent scales on the walls of vessels or pipes, and as an anti-precipitant for keeping alkaline earth cations in solution. The skewed molecular weight distribution is such that on a gel permeation chromatograph at least about 60% of the polymer has a molecular weight of about 500 to 2,000, and at least about 10% of the polymer has a molecular weight of about 4,000 to 12,000. The amount of polymer between the molecular weight range of about 2,000 to 4,000 could be between about zero and about 30%.

It is to be understood that the total amount of the anionic polymer of acrylamide having a skewed molecular weight distribution in all instances equals 100%. That is, the total amount of polymer is always 100% between the skewed molecular weight distribution of about 500 to 12,000. Thus, for example, if 60% of the polymer has a molecular weight of about 500 to 2,000, and 10% of the polymer has a molecular weight of about 4,000 to 12,000, then 30% of the polymer has a molecular weight of about 2,000 to 4,000. As the amount of polymer in the molecular weight ranges of about 500 to 2,000 and of about 4,000 to 12,000 is increased, the amount of polymer in the molecular weight range of about 2,000 to 4,000 will of necessity decrease so that the total amount of the anionic polymer of acrylamide having a skewed molecular weight distribution always equals 100%.

We have also discovered that this anionic polymer of acrylamide having a skewed molecular weight or bimodal distribution is useful as a scale inhibitor and as an anti-precipitant. As a scale inhibitor, the anionic polymer is used for controlling the deposition of adherent scales on the walls of vessels or pipes. As an anti-precipitant, the anionic polymer is used for keeping alkaline earth cations in solution.

The composition and use of the skewed molecular weight distribution anionic polymers we have discovered could be a copolymer of acrylic acid and acrylamide linkages in the mol ratios of about 20:1 to about 1:1. The acrylic acid linkages of the copolymer could then neutralize to an acrylate salt. A preferred acrylate salt is sodium acrylate. The sodium acrylate salt can be prepared by Example 1 herein.

We have discovered a synergistic effect when our skewed molecular weight anionic polymer of acrylamide is compared with a known scale inhibitor and a known anti-precipitant. That is, the polymer we have discovered having a skewed molecular weight distribution is more effective than known compositions of scale inhibitors and anti-precipitants. For an illustration of this synergistic effect, see Example 3.

The composition we have discovered, when used as a scale inhibitor and anti-precipitant, is effective because the scale inhibition is substantially provided by the lower molecular weight of the anionic polymer and the anti-precipitation is substantially provided by the higher molecular weight. That is, our synergistic effect occurs when a small amount (but large enough to maintain a peak in the gel permeation chromatograph) of the anionic polymer with an average molecular weight above 4,000 is added to a large amount of the anionic polymer with an average molecular weight below 2,000.

The use of the anionic polymer having a skewed molecular weight distribution as a scale inhibitor and anti-precipitant is effective in recirculating water systems, boilers, and in desalination systems. With regard to the latter, the anionic polymer of acrylamide having a skewed molecular weight distribution is effective in both evaporative and reverse osmosis desalination systems.

The skewed molecular weight distribution of the polymer we have discovered which is useful as a scale inhibitor and anti-precipitant exhibits a "threshold effect" or "threshold" phenomenon. This phenomenon is well known and is generally present in anti-precipitant compositions. A general description of this "threshold effect" can be found in U.S. Pat. No. 3,505,238, which is incorporated herein by reference.

DESCRIPTION OF THE PREFERRED EMBODIMENT

We have thus discovered a composition of an anionic polymer of acrylamide having a skewed molecular weight distribution. More specifically, the composition has a skewed molecular weight distribution wherein at least about 60% of the polymer has a molecular weight within the range of about 500 to 2,000, and at least about 10% of the polymer has a molecular weight of about 4,000 to 12,000. In a more preferred embodiment, about 70% of the polymer would have a molecular weight of about 500 to 2,000 and at least about 15% of the polymer would have a molecular weight of about 4,000 to 12,000. It is to be understood that the total amount of the anionic polymer of acrylamide having a skewed molecular weight distribution in all instances equals 100%. That is, the total amount of polymer is always 100% between the skewed molecular weight distribution of about 500 to 12,000. Because the process of manufacturing this skewed molecular weight anionic polymer is by a continuous polymerization or by a physical mixture of the polymer having a normal molecular weight distribution, some of the polymer will be present in the molecular weight of 2,000 to 4,000. Therefore, the inventors, in practice, can only define the skewed molecular weight distribution such that at least about 60% of the polymer has a molecular weight of about 500 to 2,000 and at least about 10% of the polymer has a molecular weight of about 4,000 to 12,000.

DESCRIPTION OF THE DRAWINGS

FIG 2 is a representative gel permeation chromatograph showing the skewed molecular weight distribution of the anionic polymers discovered by the inventors. Specifically, in the molecular weight range of 4,000 to 12,000 the amount of polymer has been boosted artificially by at least about 10%. With a normal molecular weight distribution, the amount of polymer with a molecular weight in this range would normally be about 5%.

The utility of the skewed molecular weight distribution of the anionic polymers we have discovered are useful in any application where a scale inhibitor and/or an anti-precipitant is necessary. Specific applications for scale inhibition are in: recirculating water systems, boilers, industrial process water systems and evaporative desalination systems. The skewed molecular weight anionic polymers have use as anti-precipitants in the following application: oil field flooding and reverse osmosis desalination systems. It is to be understood that in some of these applications both a scale inhibitor and anti-precipitant will be used, e.g., the recirculating and industrial process water systems discussed above.

The inventors have discovered a synergistic effect when the skewed molecular weight anionic polymers are used jointly as a scale inhibitor and anti-precipitant. This disclosure is more fully described in the Examples which follow, specifically, see Example 3.

The relationship between scale inhibition and keeping alkaline earth cations in solution has certain theoretical concepts which may be an aid to understanding the invention. The synergistic effect of the anionic polymer appears to be caused by the skewed molecular weight or bimodal distribution which the inventors have discovered. That is, not only is the molecular weight of the anionic polymer skewed by artificially boosting the higher molecular weight range from about 4,000 to 12,000, but two modes or peaks have been achieved.

Figure 2:
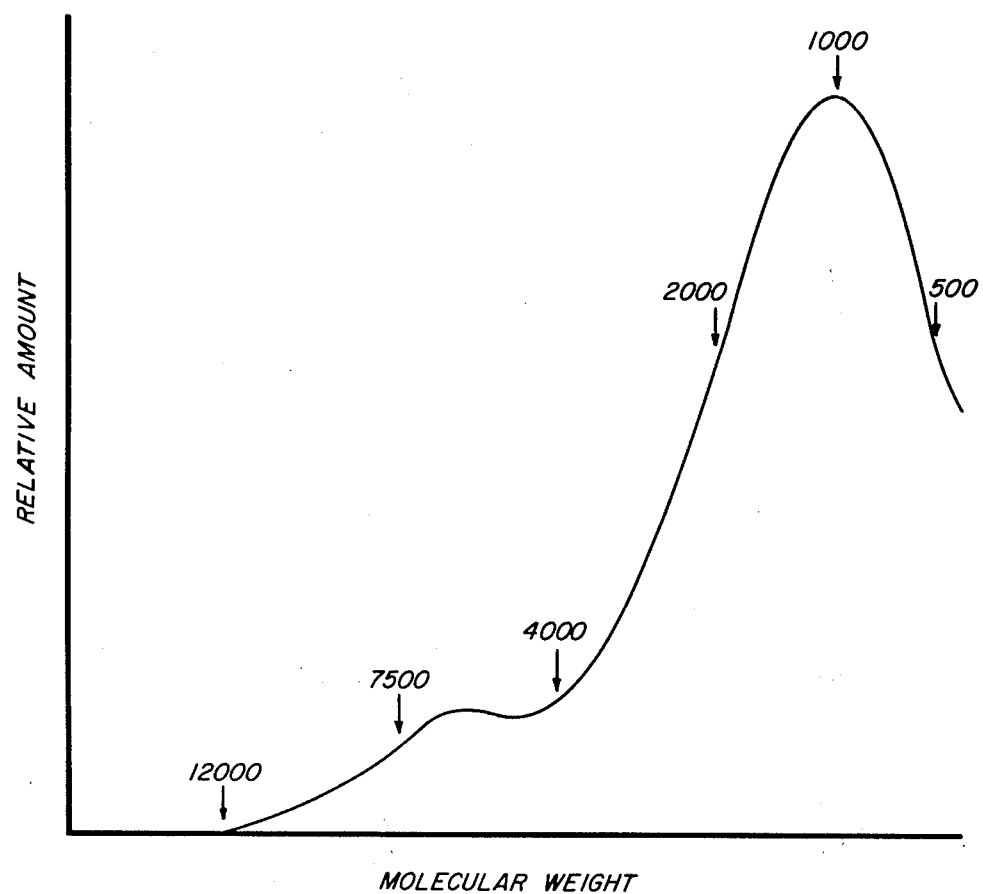

See, e.g., FIG. 2. When comparing the figures, it appears that the synergistic relationship is stronger than the molecular weight distribution is skewed heavily in the lower molecular weight range, for example, from 500 to 2,000. That is, the smaller the amount of the anionic polymer added in the higher molecular weight range, the more defined is the peak of the scale inhibitor.

The following drawings and examples are preferred embodiments of the invention. They should not be construed and are not intended as a limitation to the scope of the claims.

As an aid to understanding the examples, the following list is pertinent.

Polymer A: U.S. Pat. No. 3,463,730 having a molecular weight of about 4,000 to 7,000.
Polymer B: U.S. Pat. No. 3,463,730 having a molecular weight of about 1000 to 2,000
Polymer C: Anionic Polymer of this invention made by continuous polymerization
Polymer D: Anionic Polymer of this invention made by physical mixing.

Figure 1:
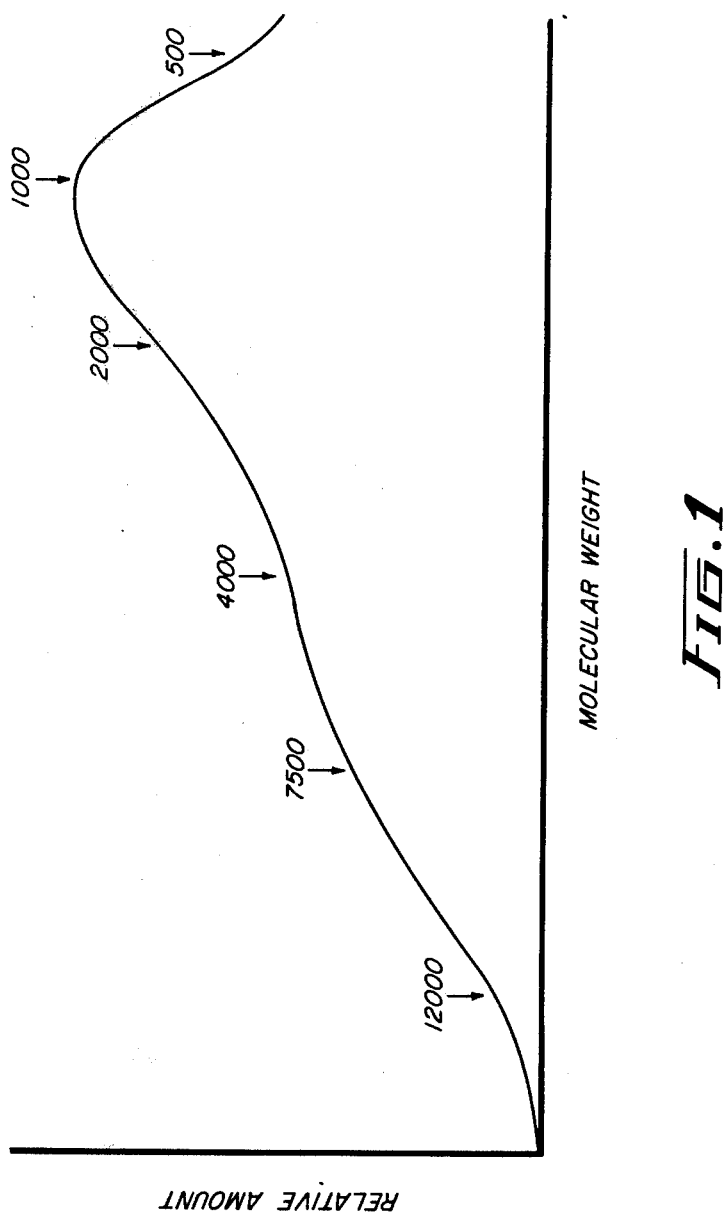
FIGS. 1, 2 and 3 are selected gel permeation chromatographs showing preferred embodiments of the invention. Gel permeation chromatography is the most effective method of analyzing the skewed molecular weight distribution of the anionic polymers discovered by the inventors. Gel permeation chromatography (GPC) is based upon the difference in effective size in solution of a given polymer. Effective size is dependent upon the molecular weight and the solvent used. The effective size is measured by injecting a polymer solution into a flowing stream of solvent which passes through porous, tiny, gel particles closely packed together in a column. Polymer molecules with small effective sizes (which is dependent upon low molecular weights) will penetrate more of the pores in the gel particles than molecules with high effective sizes (high molecular weight). Because the polymer molecules with small effective sizes will taken longer to emerge from the column than the polymer molecules with high effective sizes, the gel permeation chromatograph will be a size separation. By selection the proper instrument, the gel permeation chromatograph can be made to read out the molecular weight distribution of the polymer directly.

The accompanying drawings show the skewed molecular weight distribution for different percentages of polymer:

FIGS. 1 and 2 show preferred embodiments of the polymer made by continuous polymerization.

Figure 3:
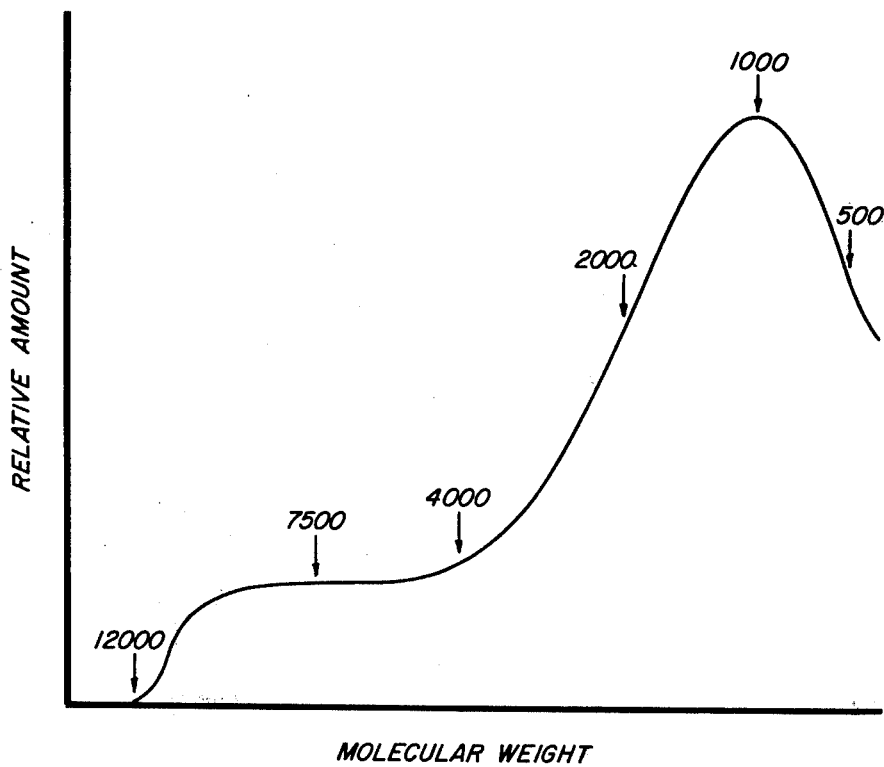

FIG. 3 shows a preferred embodiment made by physical mixing.

Figure 4:
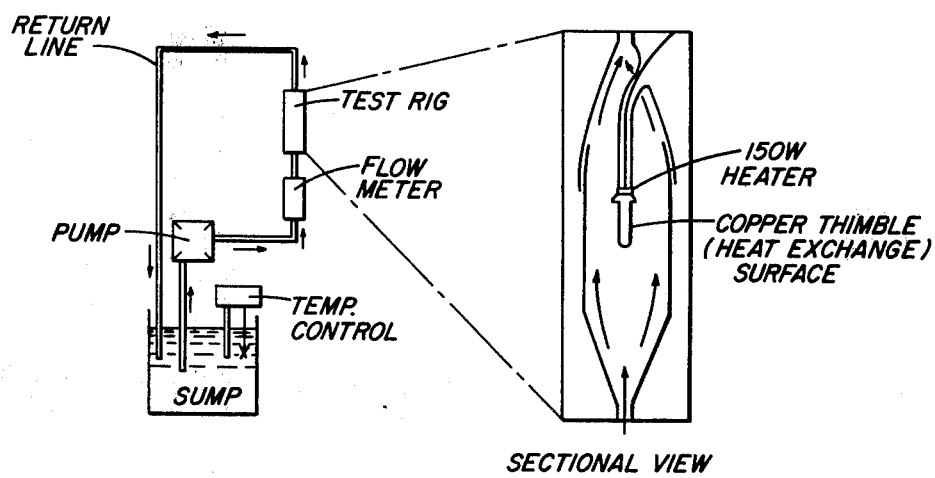
FIG. 4 shows a schematic view of a dynamic scale test apparatus.

FIG. 4 shows a schematic view of a dynamic scale test apparatus.

EXAMPLE 1

The following illustrates the preparation of Polymer C by continuous polymerization.

Three streams are fed simultaneously over a 100-minute period to a kettle at reflux, containing respectively 76 weight percent acrylamide monomer as a water solution, 3 weight percent of ammonium persulfate catalyst based on the acrylamide monomer as a 35% weight water solution, and 16 weight percent of a chain transfer agent based on the acrylamide monomer as a 38% weight water solution. The chain transfer agent is fed for the first 15 minutes at a rate equivalent to 3 weight percent on monomer, and for the last 85 minutes at a rate equivalent to 16 weight percent on monomer. The resulting polymer has a "skewed" molecular weight distribution similar to FIG. 2. This polymer is hydrolyzed to about an 85%–95% polyacrylate, and about 5%–15% polyacrylamide copolymer.

EXAMPLE 2

The following illustrates the synergistic effect of the anionic polymer as a scale inhibitor and anti-precipitant on alkaline earth metal compounds in a simulated recirculating water system.

Polymer C was prepared as disclosed in Example 1. A dynamic scale test apparatus schematically described in FIG. 4 is used to measure scale deposit and turbidity. For a description of the apparatus see *Preprints of Papers Presented at the 172nd Nat'l. Metting*, San Francisco Aug. 30–Sept. 3, 1976, Amer. Chemical Soc., Div. of Environment Chem., Washington, D.C. 1976, which is incorporated herein by reference.

The example is prepared using a synthetic test water having a composition of 600 ppm Ca++ as $CaCO_3$ and 550 ppm alkalinity at $CaCO_3$, at a pH of about 8.25. Referring to FIG. 4, the temperature control for recirculating water is set at 52° C. (125° F.) and the heaters on the testing are set to give skin temperatures on the copper thimble surface of approximately 90° C. The flow rates are set extremely low to vastly exaggerate scaling conditions. After six hours, scale deposit on a test surface and turbidity of the water is compared. The system run with no treatment becomes milky turbid almost immediately and produces about 150 mg scale deposit. Use of 8 ppm Polymer A reduces scale deposit to about 69 mg and the water is slightly hazy at the end of the 6 hour period. Use of 8 ppm Polymer B reduces the scale deposit to 17 mg but the solution becomes turbid in about 3½ hours. However, the test using 8 ppm Polymer C reduces the scale deposit to about 16 mg and kept the solution from becoming turbid for at least the full six hours. Thus, Polymer C prepared according to this invention is a very effective scale inhibitor and anti-precipitant, i.e., it optimizes performance in both applications.

EXAMPLE 3

The following is another example of the synergistic effect of the anionic polymer having a skewed molecular weight distribution on alkaline metal compounds.

The polymer of Example 1 is used. A dynamic scale test apparatus described in FIG. 4 is used to measure scale deposit and turbidity.

A test solution was prepared having 275 ppm alkalinity as $CaCO_3$, and 300 ppm $Ca^{+2}$ as $CaCO_3$ at a pH of about 9.25. The system without treatment is immediately turbid and deposits about 150 mg. scale. The system treated by 4 ppm of Polymer A remains clear but deposits about 70 mg scale. The system treated by 4 ppm of Polymer B becomes rapidly turbid and deposits about 30 mg scale. The system treated by 4 ppm of Polymer C remains clear and deposits less than 12 mg of scale. Thus, Polymer C prepared according to this invention has a synergistic effect as a scale inhibitor and anti-precipitant, i.e., it optimizes performance in both applications.

EXAMPLE 4

The following illustrates a polymer of this invention made by a physical mixture.

Polymer D is synthesized by a physical mixing of one part of Polymer A with three parts Polymer B. The results of the synthesis showing a skewed molecular weight distribution of Polymer D are described graphically in FIG. 3. Polymer D when placed in the "high pH" scale inhibition test of Example 3 performed equivalent to Polymer C.

EXAMPLE 5

The following illustrates the effect of the anionic polymer of this invention as a scale inhibitor and anti-precipitant on alkaline earth metal compounds conducted by a jar test. This test simulates the effect of the anionic polymer in a boiler.

The polymer of Example 1 is used. Stock solutions are prepared having the following consistencies:
(1) 676 mg $MgCl_2.6H_2O$ and 740 mg $CaCl_2$ in 250 ml deionized water
(2) 16 g $Na_3PO_4.12H_2O$ in 1000 ml deionized water
(3) 8 g NaOH in 1000 ml deionized water.

Two brine test solutions are then prepared by adding 5 ml of (1), 4.35 ml of (2), and 5.20 ml of (3). To the 5.20 ml of (3) in one test solution is added 5 ppm (real solids) of Polymer C. The other test solution is left blank.

The volume of the brine test solutions is run to 200 ml by the addition of deionized water. Each brine test solution gives 30 ppm of excess $PO_4^{-3}$ which will precipitate as a hydroxylapatite at a pH of b 11.5. 150 ml of the brine test solution is then placed in 400 ml beakers.

The beakers are placed in a pressure cooker at a temperature of 120° C. and a pressure of 15 psi for 15 minutes. The beakers are then removed from the pressure cooker and allowed to cool. After cooling to ambient temperature, the samples treated with Polymer C are hazy and contain a sludge. The untreated beaker forms hard, adherent deposits of hyroxylapatite.

EXAMPLE 6

The following illustrates the effect of the anionic polymer of this invention as a scale inhibitor and antiprecipitant on alkaline earth metal compounds in a simulated evaporative desalination system.

The polymer of Example 1 is used. Three stock solutions are prepared having the following consistencies:

(1) 563.5 g of $MgSO_4$, 449.9 g of $MgCl_2$ and 128.8 g of KCl in 3.5 l of deionized water.
(2) 198.19 g $CaCl_2$ in 17.5 l of deionized water.
(3) 137.54 g $NaHCO_3$ in 17.5 l of deionized water.

Two test solutions are then prepared by adding 50 Ml of (1), 63.5 ml of (2), and 100 ml of (3) to two 500 ml beakers containing 16.91 g NaCl dissolved in 264 ml of deionized water. To the 100 ml of (3) in one test solution is added 5 ppm (real solids) of Polymer C plus 1.0 ml of 0.35 M $Na_2CO_3$. The other test solution is left blank.

The two beakers are then heated with stirring to the boiling point on a hot plate. The beakers are removed from the hot plate and allowed to cool at ambient temperature for one-half hour. At the end of the half hour period the treated sample is clear. The untreated samples are turbid and precipitate $CaSO_4$.

We claim:

1. A composition of matter consisting essentially of a blend of copolymers of from about 95 to 50 mol percent acrylic acid and, correspondingly, about 5 to 50 mol percent acrylamide, said copolymers consisting of a skewed molecular weight distribution such that on a gel permeation chromatograph at least about 60% of said copolymers have a molecular weight of about 500 to 2,000, at least about 10% of said copolymers have a molecular weight of about 4,000 to 12,000 and any balance of said copolymers have a molecular weight of about 500 to 12,000.

2. A composition described in claim 1 wherein the blend is composed of copolymers of acrylic acid and acrylamide linkages in the mol ratios of about 20:1 to about 1:1.

3. A composition described in claim 2 wherein the acrylic acid linkage is neutralized to an acrylate salt.

4. A composition described in claim 3 wherein the acrylate salt is sodium acrylate.

5. A composition described in claim 1 wherein at least about 70% of said blend consists of copolymers having a molecular weight of about 500 to 2,000 and at least about 15% of said blend consists of copolymers having a molecular weight of about 4,000 to 12,000.

* * * * *